(No Model.) 2 Sheets—Sheet 1.
F. P. CRAIG.
LISTER CULTIVATOR.
No. 518,940. Patented May 1, 1894.
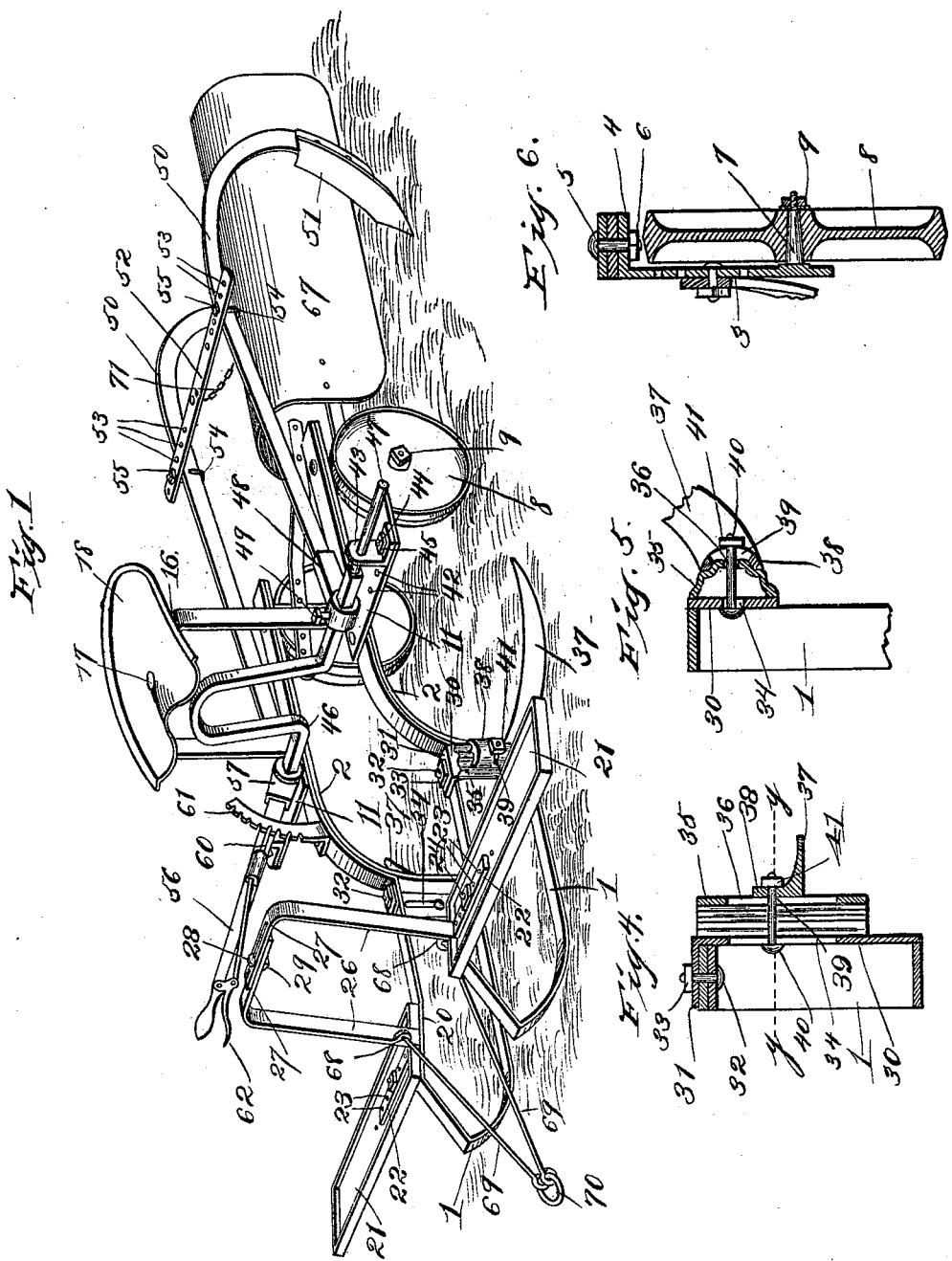
Witnesses:
M. P. Smith
G. Y. Thorpe
Inventor:
Frank P. Craig
By Hiram & Hiram
Att'ys
THE NATIONAL LITHOGRAPHING COMPANY,
WASHINGTON, D. C.

(No Model.) 2 Sheets—Sheet 2.
F. P. CRAIG.
LISTER CULTIVATOR.
No. 518,940. Patented May 1, 1894.
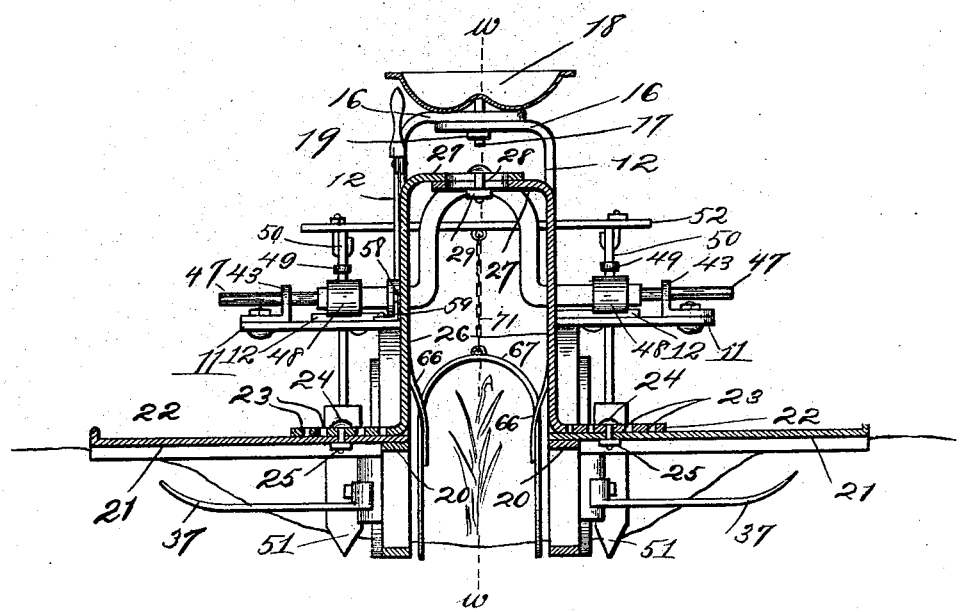
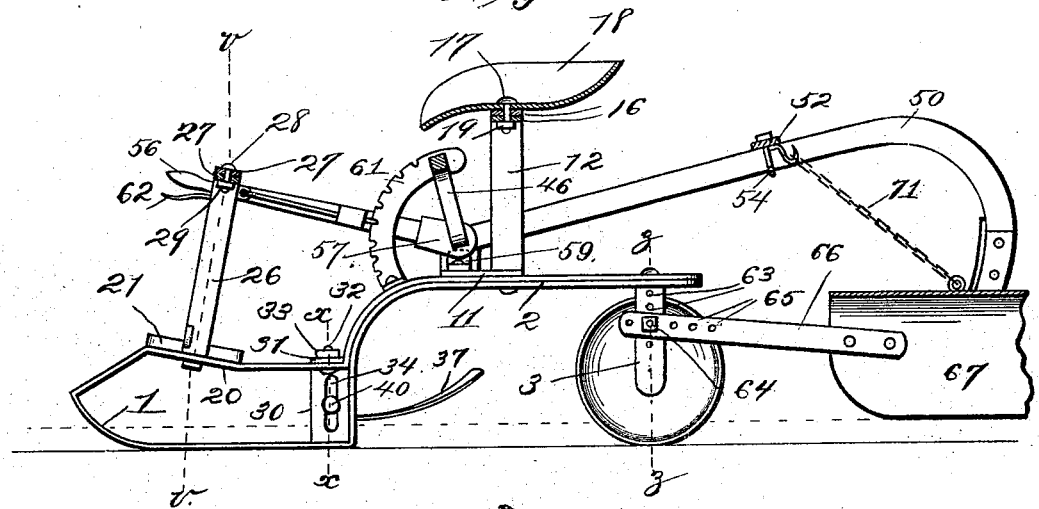
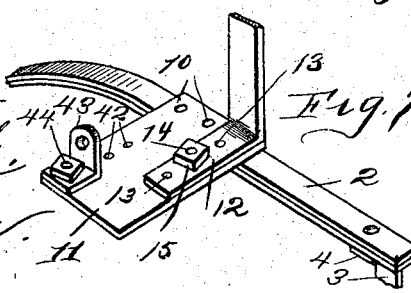
Witnesses:
M. P. Smith
G. L. Thorpe
Inventor:
Frank P. Craig.
By Higdon & Higdon, Attys.

UNITED STATES PATENT OFFICE.

FRANKLIN P. CRAIG, OF KANSAS CITY, MISSOURI.

LISTER-CULTIVATOR.

SPECIFICATION forming part of Letters Patent No. 518,940, dated May 1, 1894.

Application filed August 10, 1893. Serial No. 482,789. (No model.)

*To all whom it may concern:*

Be it known that I, FRANKLIN P. CRAIG, of Kansas City, Jackson county, Missouri, have invented certain new and useful Improvements in Lister-Cultivators, of which the following is a full, clear, and exact description, reference being had to the accompanying drawings, forming a part hereof.

My invention relates to lister cultivators, and consists of a frame provided with gangs for cutting away the ridge upon each side of the furrow, knives to destroy the weeds, the usual cultivator shovels, a shield to protect the plants, and means whereby the shovels and shield may be lifted to and held in an inoperative position, and means whereby the frame, gangs and knives may be adjusted laterally.

The object of my invention is primarily to produce a corn cultivator which is easily operated, and by running directly in the furrow may be used to work the corn a second time, as hereinafter explained, and which is simple, strong, durable and comparatively inexpensive of construction.

With these objects in view, my invention consists in certain peculiar and novel features of construction and combinations of parts, as will be hereinafter described and claimed.

In order that my invention may be fully understood, I will proceed to describe it with reference to the accompanying drawings, in which—

Figure 1, is a perspective view of a corn cultivator constructed in accordance with my invention. Fig. 2, is a vertical transverse sectional view taken on the line $v$—$v$ of Fig. 3. Fig. 3, is a vertical longitudinal sectional view taken on the line $w$—$w$ of Fig. 2. Fig. 4, is a vertical sectional view taken on the line $x$—$x$ of Fig. 3. Fig. 5, is a horizontal sectional view taken on the line $y$—$y$ of Fig. 4. Fig. 6, is a vertical sectional view taken on the line $z$—$z$ of Fig. 3, and Fig. 7, is a detail perspective view of a portion of the supporting frame-work.

Before entering upon a detail description of the invention, I wish to state that with the ordinary cultivators now in use, it is practically impossible to cultivate the corn a second time. My improved machine obviates this difficulty by running directly in the furrow and between the cultivator shovels, and the corn is cultivated as well the second time as the first, by widening out the runners and gangs, and by putting on large shovels the ridge upon each side of the furrow can be entirely destroyed.

Referring to the drawings, 1 designates a pair of runners, which may be of the skeleton form shown or solid as preferred, and these runners are oppositely disposed and parallel with each other. Curving rearwardly from the rear upper corners of the runners, and to a higher horizontal plane than the upper sides of said runners, are a pair of bars 2—2, constituting the frame-work of the machine. These bars may be formed integral with the runners as shown, or may be bolted or otherwise secured thereto as desired. A pair of vertical bars 3 have their upper and outwardly extending horizontal portions 4 resting against the under side of the bars 2 near their rear ends, and bolts 5 pass through registering holes in the bars 2 and the arms 4, and are engaged by retaining nuts 6. A stub-axle 7 projects outwardly from each bar 3 near its lower end, and mounted loosely upon said stub-axles 7 are the carrying wheels 8 of the rear portion of the frame; these carrying wheels being arranged in longitudinal alignment with the runners 1, and are secured upon the stub-axle 7, by washers, and retaining nuts 9 which engage the screw threaded outer ends of said stub axles. Bolted securely at 10 to these bars about midway their length and extending horizontally outward therefrom are the supporting plates or beams 11. A pair of vertically arranged brackets are provided at their lower ends with the outwardly extending and horizontal arms 12, and these arms are provided with a series of holes 13, one or the other of which is adapted to align with holes or apertures formed through the plates or beams 11, and passing through said aligned holes or apertures are bolts 14, engaged at their upper ends each by a retaining and clamping nut 15. The upper ends of the vertically arranged brackets are also formed with the inwardly extending and horizontal arms 16 provided with longitudinal and registering slots through which bolt 17 is vertically passed; said bolt carrying the seat 18 at its upper end and being engaged at its lower end by the clamping nut 19. The upper side of the runners 1 are formed near their front ends with the upwardly and forwardly extending inclined portion 20, and secured rigidly upon said portion of each runner at their inner ends are the inclined and transversely arranged gangs 21. A pair of vertically arranged brackets are formed at their lower ends with the outwardly extending and horizontal arms 22, these arms being provided with a series of vertical holes 23, and passing through one or the other of said holes are bolts 24, said bolts also passing vertically through registering holes in the gangs 21, and are engaged at their lower ends by clamping nuts 25. Extending horizontally inward from the upper ends of the vertical portions 26 of said brackets to form an arch, are the arms 27 which are longitudinally slotted to receive the vertical bolt 28 which passes therethrough and is engaged at its lower end by a clamping nut 29. It will be seen from the foregoing that by loosening the clamping nuts 19 and 29 the arches formed by the brackets referred to may be narrowed or widened as desired, and by thus narrowing or widening said arches the runners and wheels may be adjusted to travel in any desired width of furrow. A plate 30 vertically connects the upper and lower portions of each runner at its outer side and rear end and each plate is formed at its upper end with an inwardly extending and horizontal portion 31, which fits upon the upper side of the runner. A bolt 32 is passed vertically through registering holes in the upper portion of the runner and the arm 31, and is engaged at its upper end by a retaining nut 33. The plate 30 is also formed with a vertical slot 34.

Secured vertically to the outer side of the plate 30 and of segmental form in plan view is a standard or bracket 35, and this standard or bracket is corrugated longitudinally, and is formed with a vertical slot 36 arranged opposite the slot 34 of the plate 30. A pair of knives 37 extend divergently rearward and are preferably curved upward slightly as shown, and these knives are formed at their inner ends with a body-portion 38 which is corrugated longitudinally and closely fits the corrugated portion of the brackets 35. The body-portion of each plate is also formed with a horizontal slot 39, and passing through said slot and also through the registering slots 36 and 34 is a bolt 40, the outer end of said bolt being engaged by a clamping nut 41 which bears against the outer side of the body-portion 38. It will be seen from this construction, that by loosening clamping nut 41 the knives or blades 37 may be adjusted vertically and also laterally, so as to diverge more or less. A series of holes 42 in transverse alignment are formed vertically through the plates or beams 11 and near their front and outer margins, and passing vertically through said holes and also through bearing brackets 43 resting upon said plates or beams are bolts 44 which are engaged at their upper ends by clamping nuts 45 to secure the bearing brackets firmly in place. A crank shaft 46 extends transversely of the machine slightly in advance of the seat carrying arch, and is reduced at its opposite ends to form the cylindrical projections 47 which find a bearing in the vertical portions of the brackets 43, these cylindrical portions 47 are of length sufficient to allow for the lateral expansion or contraction of the machine hereinafter referred to. A pair of castings 48 are secured by set screws 49 upon the horizontal and squared portions of the crank shaft 46, and outward of the bars 2, and rigidly secured to said castings and extending rearwardly of the machine are the arms 50, which curving downwardly at their outer ends carry cultivator shovels 51 of the ordinary construction.

Extending transversely of and connecting the arms 50 a suitable distance from their rear end is a bar 52, and this bar is provided with a double series of holes 53 and one hole of each series is engaged by a bolt 54 carried rigidly by the arms 50, and the upper ends of said bolts are engaged by retaining nuts 55. It will be seen from this construction that by operating the set screws 49 and adjusting the bolts 54, the distance between the furrows made by the shovels 51 may be increased or diminished. A lever 56 is formed with a hub portion 57 having a squared opening which fits upon the squared portion of the crank shaft at the right hand side of the seat, and this hub-portion is also formed with a notch or groove 58 which is engaged by the vertical arm 59 of a bracket secured upon the adjacent plate or beam 11; this bracket preventing any lateral movement of the lever upon the crank shaft independent of the movement of the bars 2. This lever is also provided with a locking rod 60, adapted to engage a segment rack 61 which is carried rigidly by the adjacent bar 2. A hand lever 62 is also carried by the lever 56 through the medium of which the locking rod 60 may be disengaged from the rack 61.

The bars 3 are provided with a series of vertically aligned holes 63 through one or the other of which the bolts 64 are adapted to be passed, and these bolts are also passed through one or the other of a series of holes 65 formed through a pair of spring metal connecting bars 66, the rear ends of said connecting bars being bolted or otherwise rigidly secured to a shield 67; said shield being approximately inverted U-shape, and having its lower margins resting upon the ground and between the shovels 51. This shield or fender 67 is adapted to travel upon opposite sides of the young corn and protect it from the heavy clods or large quantities of earth, or rocks turned up by the shovels, and is also rounded at its front end and lower margins so as to more readily ride over any obstructions which may be in its path. Pivotally connected at 68 to the lower ends of the vertical portions of the front arch are the draft irons 69 which converge forwardly and are loosely connected to the ring 70 to which the double tree (not shown) is adapted to be attached, and connecting the transverse bar 52 with the shield or fender 67 about midway the length thereof, through the medium of a hook and eye is a chain or other flexible connection 71.

The general operation is as follows: The arches being first operated to adjust the runners and wheels to the desired width of furrow, and a suitable distance from the plants, the draft animals are attached in the usual manner and the machine drawn across the field so that the runners and wheels shall run in the furrow, and so that the shovels shall furrow the soil outside the line traversed by the runners and wheels, and turn the loose soil inward toward the plants; said plants being protected by the shield or fender traveling over and at each side of them, from the heavy or hard lumps of earth or rock turned by said shovels. As the machine is drawn across the field the laterally extending gangs by cutting away the ridges widens out the furrow, and the knives or blades destroy or cut down the weeds. It will be observed that by vertically adjusting the knives or blades, the weeds may be cut away at any desired point. When it is desired to cultivate or work on a second time this machine is adjusted laterally as before explained to accommodate itself to the width of furrow desired, and the gangs are also adjusted so as to cut away any desired amount of ridge and widen the furrow to give the plants a chance to root out, and cause the water in the wet season to run away from the plants and into the furrows left by the shovels, instead of following the furrow occupied by the plants to wash or drown them out. By the proper lateral adjustment of the knives or blades, they are caused to destroy the weeds on the center of the ridge, and by adjusting the link bars by means of the bolt 64, the shield or fender can be arranged so as to enable the operator to regulate the quantity of loose ground or earth thrown around the plants by the shovels. When desired or necessary, by throwing the lever 56 slightly forward, the crank shaft is operated and the shovel raised to an inoperative position, and when turning, or in traveling to or from the field, it is desirable to operate the said lever sufficiently to raise the shovels and also the shield or fender to an inoperative position, this being accomplished through the medium of the chain 71.

From the above description, it will be seen that I have produced a corn cultivator, which is efficient in operation, and which is simple, strong, durable and inexpensive of construction.

Having thus described my invention, what I claim as new, and desire to secure by Letters Patent, is—

1. A corn cultivator, comprising a frame-work, a pair of runners at the front end of the frame-work, and a pair of wheels near the rear end of the frame-work, and longitudinally aligned with the runners, said runners and wheels being adapted to run in the furrow, substantially as set forth.

2. A corn cultivator, comprising a pair of runners, and a pair of wheels longitudinally aligned with the runners, a frame-work connecting the runners and the wheels, an arch carried by the runners, and an arch connecting the frame-work, substantially as set forth.

3. A corn-cultivator, comprising a pair of runners, and a pair of wheels, longitudinally aligned with said runners, an adjustable arch connecting the runners, and an adjustable arch connecting the frame-work, and carrying a seat upon the bridge portion of said arch, substantially as set forth.

4. A corn cultivator, comprising a pair of runners, and a pair of wheels longitudinally aligned with the said runners, a frame-work connecting the runners and said wheels, adjustable arches connecting the runners and the frame-work, laterally extending gangs carried by said runners and adjustably connected with the front arch, and plates or beams carried by the frame-work and adjustably connected to the rear arch, substantially as set forth.

5. A corn cultivator, comprising a pair of runners, and a pair of wheels, a frame-work connecting the runners and said wheels, arches connecting the runners and the frame-work, and vertically and laterally adjustable knives carried by said runners, substantially as set forth.

6. A corn cultivator, comprising a frame-work, a pair of runners at the front end of said frame-work, a pair of wheels near the rear end of said frame-work and longitudinally aligned with the runners, arches connecting the runners and the frame-work, gangs carried by the runners, and knives or blades also carried by said runners, substantially as set forth.

7. In a corn cultivator, the combination with a pair of runners, a pair of wheels, a frame-work consisting of a pair of bars secured to said runners, and a vertical bar provided with a series of openings secured to the frame-work bars and carrying wheels, of a shield or fender, link bars secured thereto, and provided with a series of holes, and bolts adapted to be passed through aligned holes of the wheel carrying bars or brackets and said link bars, and a retaining nut to engage the projecting ends of said bolts, substantially as set forth.

8. A corn cultivator, comprising a frame-work, a pair of runners at the front end of the frame-work, a pair of wheels near the rear end of the frame-work, supporting plates or beams carried by said frame-work, bearing brackets adjustably carried thereby, a crank shaft journaled in said bearing brackets, a pair of arms having shovels at their rear ends, and mounted at their front ends upon the squared portions of said shaft, and set screws to hold said arms from lateral movement, substantially as set forth.

9. A corn cultivator, comprising a pair of runners and a pair of wheels, a frame-work connecting said runners and said wheels, a shaft carried by said frame-work, and shovel carrying arms carried by said shaft, a transverse bar carried by said arms, a shield or fender pivotally connected to the frame-work, and a chain connecting said shield or fender with the transverse bar of the shovel carrying arms, substantially as set forth.

10. In a corn cultivator, the combination with a pair of runners, a pair of wheels, a frame-work connecting the runners, and the wheels, of a shaft carried by the frame-work, shovel carrying arms carried by said shaft, a lever having a hub portion mounted upon said shaft, and formed with a groove, and a bracket carried by said frame-work and engaging said groove to prevent the independent lateral movement of the lever upon the shaft, substantially as set forth.

In testimony whereof I affix my signature in the presence of two witnesses.

FRANKLIN P. CRAIG.

Witnesses:
MAUD FITZPATRICK,
M. P. SMITH.